United States Patent
Cochran

(10) Patent No.: US 6,374,499 B1
(45) Date of Patent: Apr. 23, 2002

(54) DEVICE FOR CUTTING WELDED WIRE STRUCTURES

(75) Inventor: Paul W. Cochran, Stillman Valley, IL (US)

(73) Assignee: Greenlee Textron Inc., Rockford, IL (US)

(*) Notice: Subject to any disclaimer, the term of this patent is extended or adjusted under 35 U.S.C. 154(b) by 0 days.

(21) Appl. No.: 09/645,134

(22) Filed: Aug. 24, 2000

Related U.S. Application Data

(60) Provisional application No. 60/163,889, filed on Nov. 5, 1999.

(51) Int. Cl.[7] ............................................. B26B 13/06
(52) U.S. Cl. ........................................ 30/233; 30/134
(58) Field of Search ......................... 30/254, 134, 251, 30/252, 229, 233; 72/409.01, 329

(56) References Cited

U.S. PATENT DOCUMENTS

| | | | |
|---|---|---|---|
| 3,312,988 A | * | 4/1967 | Shannon .............. 72/409.01 X |
| 5,084,935 A | * | 2/1992 | Kalthoff .............. 72/409.01 X |
| 6,112,415 A | | 9/2000 | Hagene et al. |

FOREIGN PATENT DOCUMENTS

| | | |
|---|---|---|
| FR | 2529813 | 1/1984 |
| WO | WO9319880 | 10/1993 |
| WO | WO0041857 | 7/2000 |

* cited by examiner

*Primary Examiner*—Douglas D. Watts
(74) *Attorney, Agent, or Firm*—Trexler, Bushnell, Giangiorgi, Blackstone & Marr, Ltd.

(57) ABSTRACT

A device for cutting a welded wire structure is provided. The welded wire structure includes a first wire and a second wire which are joined together and are offset relative to each other. The device includes a first arm pivotally connected to a second arm. The first arm includes a handle and a jaw connected thereto. The second arm includes a handle and a jaw connected thereto. The jaws are offset from each other. The jaw of the first arm includes a U-shaped portion into which the first wire is capable of being positioned during cutting. The jaw of the second arm includes a notch provided in a surface thereof which faces the jaw of the first arm. The second wire is capable of being positioned within the notch during cutting.

6 Claims, 2 Drawing Sheets

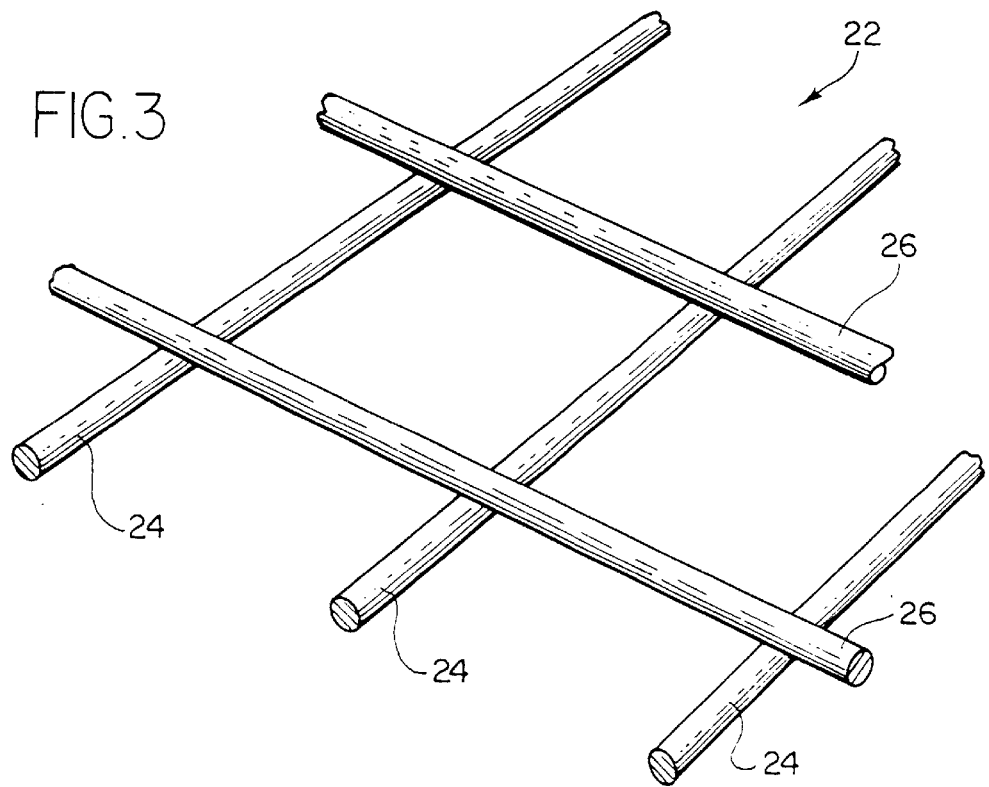
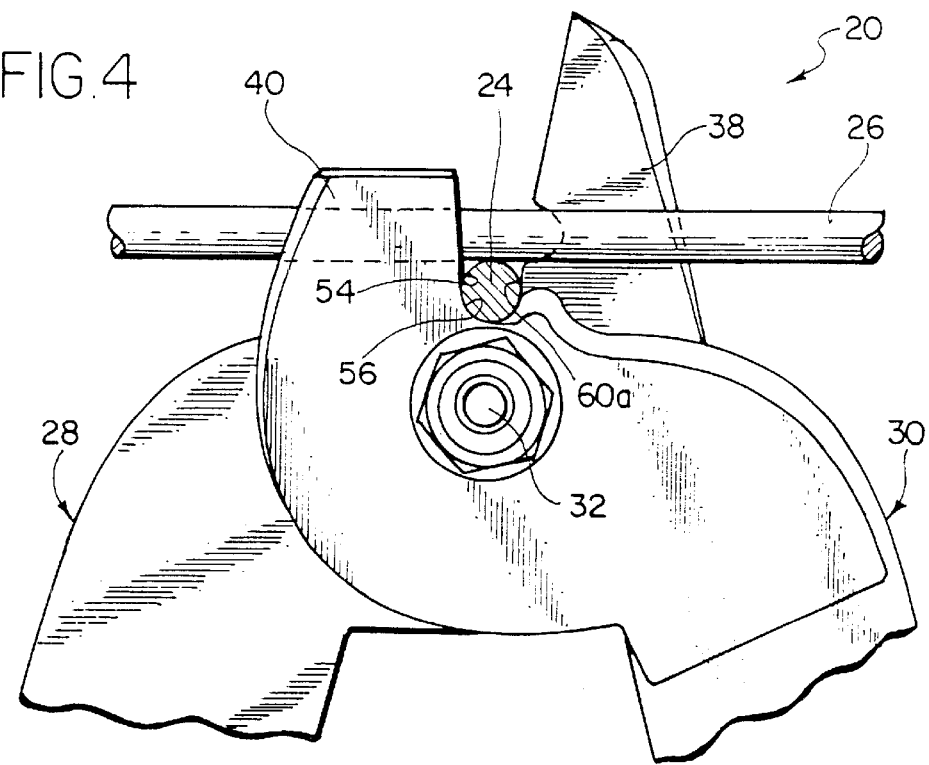

DEVICE FOR CUTTING WELDED WIRE STRUCTURES

This application is based upon and claims the priority of U.S. Provisional Application Ser. No. 60/163,889 filed on Nov. 5, 1999 and entitled "Device for cutting welded wire structures".

BACKGROUND OF THE INVENTION

This invention is generally directed to a novel device for cutting welded wire structures. More particularly, the invention contemplates a novel device which cuts a wire of a welded wire structure to form a clean, burr-free cut.

Prior art wire cutters pinch the wire to sever the wire. Cutting the wire with this type of wire cutter can leave a surface which has burrs thereon. Burrs are obviously undesirable.

The present invention provides a device which overcomes this problem and which provides advantages over the prior art, such advantages will become clear upon a reading of the attached specification in combination with a study of the drawings.

OBJECTS AND SUMMARY OF THE INVENTION

A general object of the present invention is to provide a device for cutting welded wire structures.

An object of the present invention is to provide a device which cuts a wire of a welded wire structures to form a clean, burr-free cut.

Yet another object of the present invention is to provide a device which is easy to use.

Briefly, and in accordance with the foregoing, the present invention discloses a device for cutting a welded wire structure. The welded wire structure includes a first wire and a second wire which are joined together and are offset relative to each other. The device includes a first arm pivotally connected to a second arm. The first arm includes a handle and a jaw connected thereto. The second arm includes a handle and a jaw connected thereto. The jaws are offset from each other. The jaw of the first arm includes a U-shaped portion into which the first wire is capable of being positioned during cutting. The jaw of the second arm includes a notch provided in a surface thereof which faces the jaw of the first arm. The second wire is capable of being positioned within the notch during cutting.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which:

FIG. 3 is a partial perspective view of welded wire structure which the device is used to cut; and FIG. 4 is a side elevational view of the device in the open position showing the position of the wires therein.

DETAILED DESCRIPTION OF THE ILLUSTRATED EMBODIMENT

Figure 1:
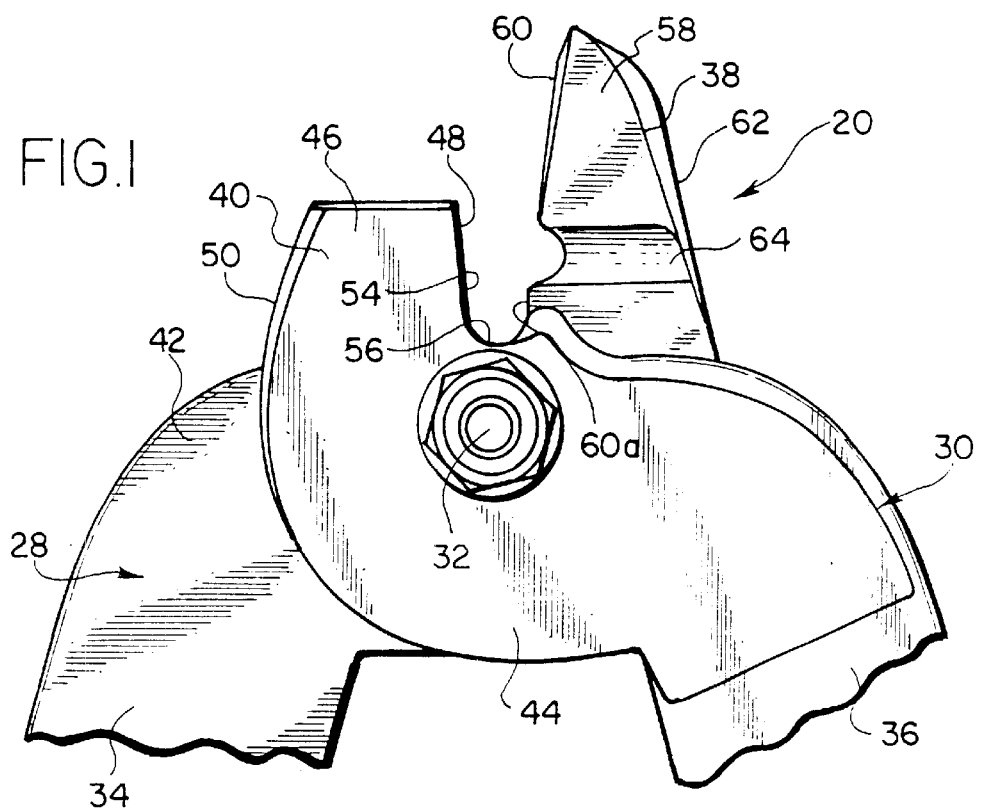
FIG. 1 is a side elevational view of a device which incorporates the features of the invention in an open position.
Figure 2:
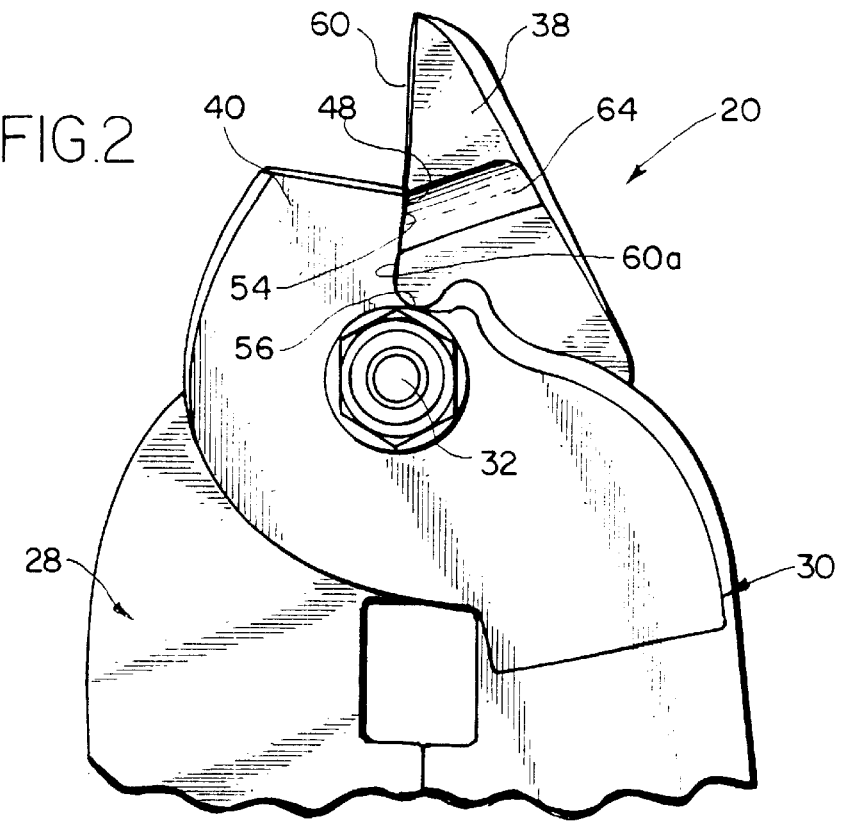
FIG. 2 is a side elevational view of the device of FIG. 1 in a closed position.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

The present invention is a device 20 which is used to cut a welded wire structure 22, such as a basket-type cable tray or a livestock panel. The device 20 of the present invention shears a wire in the wire structure 22 to form a clean, burr-free cut.

As shown in FIG. 4, the welded wire structure 22 includes a first set of round wires 24 which extend in a first direction and which are parallel to each other and are spaced apart from each other, and a second set of round wires. 26 which extend in a second direction which is offset from the first direction and which are spaced apart from each other. As shown, the wires 24, 26 are generally perpendicular to each other. Each wire 26 in the second set is welded to the wires 24 in the first set over which it crosses.

The device 20 includes a pair of arms 28, 30. Each arm 28, 30 has first and second opposite ends and are fastened together at a hinge joint 32 along the length of the arms 28, 30 such that the arms 28, 30 can be brought proximate to each other or can be spread apart from each other by rotation around the hinge joint 32.

A handle 34, 36 is provided at the respective first end of each arm 28, 30. The handles 34, 36 are gripped by a user to actuate the device 20. A metal jaw 38, 40 is provided at the respective second end of each arm 28, 30. Jaw 38 is connected to handle 34 by a connection portion 42. Jaw 40 is connected to handle 36 by a connection portion 44. The hinge joint 32 hingedly connects the connection portions 42, 44 together. Jaw 40 is shorter than jaw 38 to reduce the amount of material used to make the device 20. With regard to the arm 28, the handle 34 is on one side of the hinge joint 32 (shown on the left in the drawings) and the jaw 38 is on the other side of the hinge joint 32 (shown on the right in the drawings). With regard to the arm 30, the handle 36 is on one side of the hinge joint 32 (shown on the right in the drawings) and the jaw 40 is on the other side of the hinge joint 32 (shown on the left in the drawings). In addition, the jaws 38, 40 are offset from each other as described herein.

The jaw 40 on the arm 30 includes a generally flat outer side surface 46 and a generally flat inner side surface (not shown). The outer side surface 46 and the inner side surface are parallel to each other and are joined together by an inner surface 48 and an outer surface 50.

The inner surface 48 is used to position the wire, for example wire 24, which is to be cut and is used to cut the wire 24. The inner surface 48 has a generally flat portion 54 which extends from the end of the jaw 40 to a point which is spaced from the hinge joint 32 and a generally U-shaped portion 56 which is integrally formed therewith, transitions smoothly therewith, and which is proximate to the hinge joint 32. The wire 24 that is to be cut is positioned within the U-shaped portion 56, see FIG. 4, during cutting.

The jaw 38 on the arm 28 includes a generally flat inner side surface 58 and a generally flat outer side surface (not shown). The inner side surface 58 and the outer side surface are parallel to each other and are joined together by an inner surface 60 and an outer surface 62. The inner surface 60 is generally flat.

The inner side surface 58 includes an elongated curved notch 64 therein which extends across the width of the jaw 38. The wire 26 which is offset from the wire 24 which is to be cut is positioned within the curved notch 64 during cutting. The portion 60a of the inner surface 60 which is between the notch 64 and the hinge joint 32 abuts against the wire 24 which is to be cut. The notch 64 is sized such that the wire 26 can be held completely therewith.

The jaws 38, 40 are offset from each other such that when the handles 34, 36 are brought together, the inner surface 58 of jaw 38 and the inner surface (not shown) of jaw 40 align with each other, but do not overlap each other.

During cutting as shown in FIG. 4, the device 20 is engaged with the wire structure 22 by opening the jaws 38, 40 and engaging jaw 38 against the wire 26 which is to remain uncut and sliding the wire 26 along the jaw 38 until the wire is seated within the notch 64 in the jaw 38. As such, the elongated jaw 38 acts as a guide for properly positioning the wire 26. The notch 64 is sized such that the cross wire 26 sits completely therein and does not protrude outwardly from the inner side surface 58. Jaw 40 is on the opposite side of the wire 26. The wire 24 that is to be cut is positioned in the U-shaped portion 56 of the inner surface 48 of the jaw 40. The portion 60a of the inner surface 60 of the jaw 38 between the notch 64 and the hinge joint 32 abuts against the wire 24 which is to be cut at a position which is proximate to the cutting location.

The arm 30 is then moved relative to the arm 28 such that the jaw 40 moves toward the jaw 38. The jaw 38 bears against the wire 24 which is to be cut and, as such, cannot move. As this movement of the arm 30 is undertaken, the inner surface 48 of jaw 40 shears the wire 24 at the point proximate to the cross wire 26 and proximate to the point where the wires 24 and 26 are welded together (such that weld is not sheared). The device 20 of the present invention shears the wire 24 to form a clean, burr-free cut.

While the wires 24, 26 are shown as generally perpendicular to each other, it is to be understood that other angular configurations can be provided, with the notch 64 being correspondingly oriented.

Jaw 40 can also have a recess (not shown) provided in its outer side surface 46 to further reduce the amount of material required to form the jaw 40. The provision of the recess reduces the thickness of the inner surface 48 proximate thereto relative to the remainder of the jaw 40. The reduced thickness of jaw 40 as a result of the recess can aid in shearing the wire 24.

While a preferred embodiment of the present invention is shown and described, it is envisioned that those skilled in the art may devise various modifications of the present invention without departing from the spirit and scope of the appended claims.

The invention claimed is:

1. A device for cutting a wire structure, the wire structure comprising a first wire and a second wire which are joined together and are offset relative to each other, said device comprising:

a first arm including a handle and a jaw connected thereto, and a second arm including a handle and a jaw connected thereto, said first arm and said second arm being operatively joined together and said jaw of said first arm being offset from said jaw of said second arm, the first wire capable of being positioned between said jaws and cut upon actuation of the device, said jaw of said second arm including a notch therein into which the second wire is capable of being positioned such that the second wire remains uncut upon actuation of the device.

2. A device as defined in claim 1, wherein said notch is provided in a surface of said jaw of said second arm which faces said jaw of said first arm.

3. A device as defined in claim 1, wherein said jaw of said first arm includes a U-shaped portion into which the first wire is capable of being positioned.

4. A device as defined in claim 1, wherein said first arm and said second arm are hingedly connected.

5. A device for cutting a wire structure, the wire structure comprising a first wire and a second wire which are joined together and are offset relative to each other, said device comprising:

a first arm including a handle and a jaw connected thereto, and a second arm including a handle and a jaw connected thereto, said first arm and said second arm being operatively joined together and said jaw of said first arm being offset from said jaw of said second arm, said jaw of said first arm including a U-shaped portion into which the first wire is capable of being positioned and being cut upon actuation of the device, said jaw of said second arm including a notch provided in a surface thereof which faces said jaw of said first arm, the second wire being capable of being positioned within said notch such that the second wire remains uncut upon actuation of the device.

6. A device as defined in claim 5, wherein said first arm and said second arm are hingedly connected.

* * * * *